United States Patent
Barsness et al.

(10) Patent No.: US 9,122,525 B2
(45) Date of Patent: Sep. 1, 2015

(54) ENVIRONMENT BASED NODE SELECTION FOR WORK SCHEDULING IN A PARALLEL COMPUTING SYSTEM

(71) Applicant: International Business Machines Corporation, Armonk, NY (US)

(72) Inventors: Eric L. Barsness, Pine Island, MN (US); David L. Darrington, Rochester, MN (US); Amanda Randles, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/067,694

(22) Filed: Oct. 30, 2013

(65) Prior Publication Data

US 2014/0059556 A1   Feb. 27, 2014

Related U.S. Application Data

(63) Continuation of application No. 12/406,217, filed on Mar. 18, 2009, now Pat. No. 8,589,931.

(51) Int. Cl.
*G06F 9/48* (2006.01)
*G06F 9/50* (2006.01)
*G06F 1/32* (2006.01)

(52) U.S. Cl.
CPC ............ *G06F 9/4893* (2013.01); *G06F 1/3203* (2013.01); *G06F 9/5094* (2013.01); *G06F 1/329* (2013.01); *Y02B 60/142* (2013.01); *Y02B 60/144* (2013.01)

(58) Field of Classification Search
CPC ..... G06F 1/206; G06F 9/5094; G06F 9/5027; G06F 9/505; G06F 1/329; G06F 9/4893; G06F 1/3203; H05K 7/20836; Y02B 60/142; Y02B 60/144
USPC .......... 713/300, 320, 323, 324; 718/102, 104, 718/105; 702/132, 184, 185, 188; 709/223, 709/224

See application file for complete search history.

(56) References Cited

U.S. PATENT DOCUMENTS

| 5,303,369 | A | * | 4/1994 | Borcherding et al. | ........ 718/104 |
| 5,704,012 | A | * | 12/1997 | Bigus | .............................. 706/19 |
| 5,892,945 | A | * | 4/1999 | Mirchandaney et al. | ..... 718/104 |

(Continued)

OTHER PUBLICATIONS

Soni et al. Grouping-Based Job Scheduling Model in Grid Computing. World Academy of Science, Engineering and Technology 41. 2010.

(Continued)

*Primary Examiner* — Thomas J Cleary
(74) *Attorney, Agent, or Firm* — Scott A. Stinebruner

(57) ABSTRACT

A method, apparatus, and program product manage scheduling of a plurality of jobs in a parallel computing system of the type that includes a plurality of computing nodes and is disposed in a data center. The plurality of jobs are scheduled for execution on a group of computing nodes from the plurality of computing nodes based on the physical locations of the plurality of computing nodes in the data center. The group of computing nodes is further selected so as to distribute at least one of a heat load and an energy load within the data center. The plurality of jobs may be additionally scheduled based upon an estimated processing requirement for each job of the plurality of jobs.

20 Claims, 9 Drawing Sheets

(56) References Cited

U.S. PATENT DOCUMENTS

| | | | | |
|---|---|---|---|---|
| 7,197,433 | B2* | 3/2007 | Patel et al. | 702/188 |
| 7,426,453 | B2* | 9/2008 | Patel et al. | 702/185 |
| 7,447,920 | B2* | 11/2008 | Sharma et al. | 713/300 |
| 7,644,148 | B2* | 1/2010 | Ranganathan et al. | 709/223 |
| 7,724,149 | B2* | 5/2010 | Kettler et al. | 340/584 |
| 7,770,176 | B2* | 8/2010 | Maeda et al. | 718/105 |
| 7,814,489 | B2* | 10/2010 | Uemura et al. | 718/103 |
| 7,873,869 | B2* | 1/2011 | Darrington et al. | 714/15 |
| 7,877,751 | B2* | 1/2011 | Maeda et al. | 718/102 |
| 7,878,008 | B1* | 2/2011 | Mateski et al. | 62/129 |
| 7,953,574 | B2* | 5/2011 | Arakawa et al. | 702/132 |
| 8,271,639 | B2* | 9/2012 | Joukov | 709/223 |
| 2002/0158898 | A1* | 10/2002 | Hsieh et al. | 345/736 |
| 2003/0193777 | A1* | 10/2003 | Friedrich et al. | 361/687 |
| 2006/0047808 | A1* | 3/2006 | Sharma et al. | 709/224 |
| 2006/0112286 | A1* | 5/2006 | Whalley et al. | 713/300 |
| 2006/0168975 | A1* | 8/2006 | Malone et al. | 62/180 |
| 2007/0005382 | A1* | 1/2007 | Sayers | 705/1 |
| 2009/0100437 | A1* | 4/2009 | Coskun et al. | 718/105 |
| 2009/0228726 | A1* | 9/2009 | Malik et al. | 713/320 |
| 2009/0265568 | A1* | 10/2009 | Jackson | 713/320 |
| 2010/0010688 | A1* | 1/2010 | Hunter | 700/300 |
| 2010/0050180 | A1* | 2/2010 | Amsterdam et al. | 718/104 |
| 2012/0030356 | A1* | 2/2012 | Fletcher | 709/226 |

OTHER PUBLICATIONS

Igbal et al. Job Scheduling in HPC Clusters. Dell Power Solutions. Feb. 2005.

Hewlett Packard. HP BladeSystem c-Class Site Planning Guide. Jan. 2009.

* cited by examiner

| Node | Core | Busy | Temp (C) | Time Left | Location ||| Power Circuit | Cooling Source | Job Waiting |
|------|------|------|----------|-----------|-------------|------|----------------------|---------|---------|------|
|      |      |      |          |           | Data Center | Room | X,Y,Z | Prox. To Cooling Source |  |  |  |
| Node A | Core 1 | Yes | 102 | 0:01:53 | 1 | 1 | 5,6,3 | 5 | A | A | No |
|        | Core 2 | No  | 82  | 0:00:00 |   |   |       |   |   |   | No |
| Node B | Core 1 | Yes | 100 | 10:04:53 | 2 | 1 | 12,18,1 | 6 | Y | Y | No |
|        | Core 2 | Yes | 95  | 0:46:44 |   |   |       |   |   |   | No |
| Node C | Core 1 | No  | 64  | 0:00:00 | 1 | 2 | 16,18,6 | 1 | C | C | No |
|        | Core 2 | No  | 60  | 0:00:00 |   |   |       |   |   |   | No |
| Node D | Core 1 | Yes | 85  | 100:34:22 | 1 | 4 | 6,12,5 | 3 | G | H | No |
|        | Core 2 | No  | 72  | 0:00:00 |   |   |       |   |   |   | No |
| Node E | Core 1 | Yes | 70  | 0:00:01 | 1 | 4 | 6,12,5 | 3 | G | H | Yes |
|        | Core 2 | Yes | 83  | 1:13:18 |   |   |       |   |   |   | No |
| ... |

FIG. 11

| Power Circuit | Energy Load | Temp (C) | Location ||||
|---------------|-------------|----------|-------------|------|-------|-----------------------|
|               |             |          | Data Center | Room | X,Y,Z | Prox. To Cooling Source |
| A | 4.2 | 65  | 1 | 1 | 5,4,0  | 3 |
| B | 3.6 | 50  | 1 | 1 | 10,4,0 | 3 |
| C | 0.8 | 29  | 1 | 2 | 5,2,0  | 1 |
| D | 9.0 | 122 | 1 | 2 | 13,1,0 | 8 |
| ... |

| Cooling Source | Nodes Served | Power Circuits | Temp (C) | Location | | |
|---|---|---|---|---|---|---|
| | | | | Data Center | Room | X,Y,Z |
| A | 50 | 1 | 23 | 1 | 1 | 5,1,0 |
| B | 50 | 1 | 22 | 1 | 1 | 10,1,0 |
| C | 100 | 2 | 30 | 1 | 2 | 5,1,0 |
| ... | | | | | | |

| Job | Avg. Temp (C) | Avg. Length | Hot or Cool | Processing Requirements | Avg. Increase to Core Temperature | Avg. Increase to Energy Load | Special Instructions |
|---|---|---|---|---|---|---|---|
| AHZ000 | 80 | 1:02:44 | Cool | Medium | 10 | 0.1 | |
| BZT900 | 65 | 12:56:33 | Cool | Low | -5 | -1 | Configure on hot node. |
| EFM677 | 81 | 0:01:02 | Cool | High | 11 | 0.2 | |
| HAA303 | 110 | 0:32:45 | Hot | High | 40 | 0.5 | Configure close to cooling source. |
| ... | | | | | | | |

FIG. 14

ENVIRONMENT BASED NODE SELECTION FOR WORK SCHEDULING IN A PARALLEL COMPUTING SYSTEM

CROSS-REFERENCE TO RELATED APPLICATIONS

This application is a continuation of U.S. patent application Ser. No. 12/406,217, filed on Mar. 18, 2009 by Eric Lawrence Barness et al. (ROC920070650US1), the entire disclosure of which is incorporated by reference herein.

FIELD OF THE INVENTION

The present invention relates to computing systems, and more particularly to heat and power management of computing systems.

BACKGROUND OF THE INVENTION

Computing technology has advanced at a remarkable pace, with each subsequent generation of computing system increasing in performance, functionality, and storage capacity, often at reduced cost. However, despite these advances, many scientific and business applications still demand massive computing power, which can only be met by extremely high performance computing systems. One particular type of computing system architecture that is often used in high performance applications is a parallel processing computing system.

Generally, a parallel processing computing system comprises a plurality of computing nodes and is configured with a distributed application. Some parallel processing computing systems, which may also be referred to as massively parallel processing computing systems, may have hundreds or thousands of individual computing nodes, and provide supercomputer class performance. Each computing node is typically of modest computing power and generally includes one or more processing units, or computing cores. As such, each computing node may be a computing system configured with an operating system and distributed application. The distributed application provides work for each computing node and is operable to control the workload of the parallel processing computing system. Generally speaking, the distributed application provides the parallel processing computing system with a workload that can be divided into a plurality of jobs. Typically, each computing node, or each computing core, is configured to process one job and therefore process, or perform, a specific function. Thus, the parallel processing architecture enables the parallel processing computing system to receive a workload, then configure the computing nodes to cooperatively perform one or more jobs such that the workload supplied by the distributed application is processed substantially in parallel.

Parallel processing computing systems have found application in numerous different computing scenarios, particularly those requiring high performance and fault tolerance. For instance, airlines rely on parallel processing to process customer information, forecast demand, and decide what fares to charge. The medical community uses parallel processing computing systems to analyze magnetic resonance images and to study models of bone implant systems. As such, parallel processing computing systems typically perform most efficiently on work that contains several computations that can be performed at once, as opposed to work that must be performed serially. The overall performance of the parallel processing computing system is increased because multiple computing cores can handle a larger number of tasks in parallel than could a single computing system. Other advantages of some parallel processing systems include their scalable nature, their modular nature, and their improved level of redundancy.

When processing a workload, computing nodes of a parallel processing computing system typically operate to process each job of the workload as fast as possible while keeping as few computing nodes active as possible to process the workload. During this processing, these computing nodes typically consume a large amount of power as well as generate a large amount of heat. As such, large and complex air handling systems must be designed and installed to keep the room, or rooms, where a parallel processing computing system is installed at an acceptable temperature. Similarly, large and complex power circuits must be designed and installed to keep the computing nodes supplied with sufficient power to process jobs. However, conventional work scheduling algorithms for jobs generally fail to take heat generation from these computing nodes and power circuits issues into account. Conventional work scheduling algorithms similarly generally fail to take energy consumption issues into account. Conventional work scheduling algorithms generally attempt to keep as many nodes idle as long as possible, forcing jobs onto as few nodes as possible. As a result, though the average temperature of a data center and/or system may be within an acceptable temperature, localized areas of heat generation and energy usage typically arise. These heat and energy "islands" often increase the wear on components, and generally result in increased maintenance, component replacement, and cost to use parallel processing computing systems.

Consequently, there is a need to schedule a workload of a parallel processing computing system in such a manner that manages job scheduling to reduce heat and energy islands that may otherwise arise.

SUMMARY OF THE INVENTION

Embodiments of the invention provide for a method, apparatus, and program product to address power consumption and heat generation issues that arise when scheduling parts of a workload across a parallel computing system disposed in a data center. In particular, embodiments of the invention provide for managing a plurality of jobs throughout a plurality of computing nodes of the parallel computing system. Typically, power consumption and heat generation issues arise based upon the location of the nodes scheduled with jobs, the location of power circuits that provide the nodes with power, and the location of cooling sources, such as cooling towers and other cooling components. Embodiments of the invention take advantage of the fact that some nodes at any given time are configured at physical locations that are typically cooler than others and/or are coupled to various power circuits. Thus, by scheduling jobs based on the physical location of those nodes, at least one of a heat load and an energy load may be better distributed within the data center.

In one embodiment consistent with aspects of the invention, the jobs are managed by scheduling the plurality of jobs for execution on a group of computing nodes from among the plurality of computing nodes in the parallel computing system based upon the physical locations of the plurality of computing nodes in the data center. This scheduling includes selecting the group of computing nodes so as to distribute at least one of a heat load and an energy load within the data center. The plurality jobs are executed on the group of computing nodes.

In that embodiment, the heat load or energy load may be distributed in a substantially uniform manner. Additionally, scheduling the plurality of jobs may further include requesting a graphical representation of the physical locations of the plurality of computing nodes in the data center from a user. In some embodiments, scheduling the plurality of jobs may further include rescheduling a job from a first computing node to a second computing node.

In some embodiments, scheduling the plurality of jobs may include determining a computing node heat load for each computing node from among the plurality of computing nodes, and rescheduling a job from a first computing node with a high computing node heat load to a second computing node with a lower computing node heat load than that of the first computing node. In other embodiments, scheduling the plurality of jobs may include determining power circuit energy loads of a plurality of power circuits distributed throughout the data center and rescheduling a job from a first computing node that draws energy from a first power circuit with a high power circuit energy load to a second computing node that draws energy from a second power circuit with a lower power circuit energy load than that of the first power circuit. Throughout the embodiments, the data center may be distributed across two or more locations that are geographically distant from each other.

In some embodiments, the data center includes one or more cooling sources. These cooling sources may be cooling towers or other cooling components, such as refrigeration or thermoelectric cooling units. In those embodiments, scheduling the plurality of jobs may be additionally based on physical locations of the one or more cooling sources in the data center, including selecting the group of computing nodes so as to distribute the heat load within the data center. In those embodiments, selecting the group of computing nodes may include selecting the group of computing nodes based upon proximity to the one or more cooling sources.

In some embodiments, scheduling the plurality of jobs is additionally based upon an estimated processing requirement for each job of the plurality of jobs.

These and other advantages will be apparent in light of the following figures, detailed description, and illustrative examples.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 11 is a diagrammatic illustration of a node and system information table that includes information about the nodes of the systems consistent with those illustrated throughout FIGS. 1-6;

FIG. 12 is a diagrammatic illustration of a power circuit information table that includes information about the power circuits of the systems consistent with those illustrated throughout FIGS. 1-6.

FIG. 13 is a diagrammatic illustration of a cooling source information table that includes information about the cooling sources of the systems consistent with those illustrated throughout FIGS. 1-6; and FIG. 14 is a diagrammatic illustration of a job information table that includes historic information about each job executed by the systems consistent with those illustrated throughout FIGS. 1-6.

DETAILED DESCRIPTION

Figure 1:
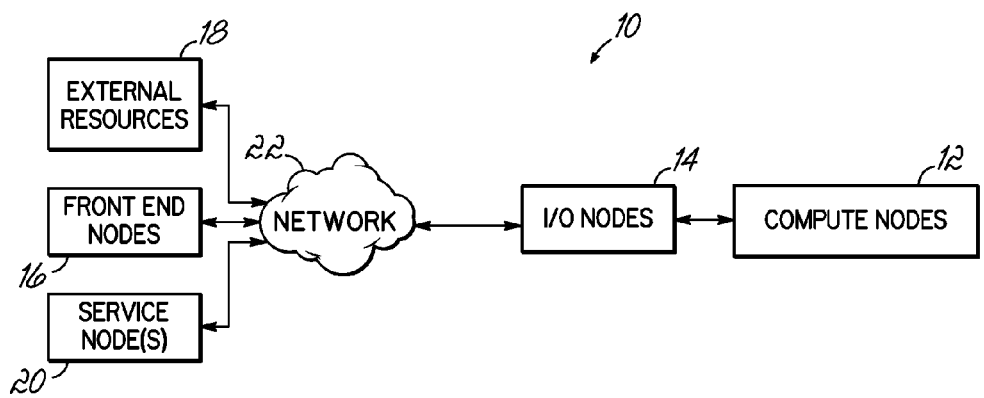
FIG. 1 is a diagrammatic illustration of parallel processing computing system consistent with embodiments of the invention.

Embodiments of the present invention include a method, apparatus, and program product to manage jobs to distribute at least one of a heat load and an energy load when processing a workload across computing nodes of a parallel processing computing system.

Parallel processing computing systems, such as the BlueGene/L system created by International Business Machines, often include a cellular node architecture. As discussed below in detail, the BlueGene/L system is built from blocks of node midplanes that may be connected through several inter- and intra-midplane networks. The system may be constructed incrementally, with midplane cells being added to build the larger, final system.

The primary point to point message passing network for BlueGene/L is a three dimensional torus network, where every node is connected to six other nodes in a mesh, forming a cube of (x,y,z) nodes. For example, a 512 node midplane torus consists of an 8×8×8 node arrangement. "Torus" implies that the nodes on the face of the cube wrap around to connect to nodes on the opposite face. This torus network can be extended in all three directions by connecting the faces of these logical cubes via link chips, which are essentially switches between midplanes. The link chips are connected via cables, while the internal torus is connected via circuitry within the midplane. Each node is configured with one or more computing cores.

The parallel processing computing system is configured to receive a workload and divide the workload into parts, or jobs, that are operable to be executed, or processed, by the nodes of the system. As such, the parallel processing computing system is configured to perform several computations at once. Each node may execute one job, or each computing core may execute one job, depending on the configuration of the parallel processing computing system. In one embodiment consistent with the invention to distribute at least one of the heat load and energy load of the system, there is provided a method that manages a plurality of jobs throughout a plurality of computing nodes. In one embodiment of the invention, a plurality of jobs are respectively scheduled for execution on a group of computing nodes from among the plurality of computing nodes based on the physical locations of the plurality of computing nodes in the data center. Scheduling the plurality of jobs includes selecting the group of computing nodes to as to distribute at least one of the heat load and energy load within the data center. The plurality of jobs may be subsequently executed on the group of computing nodes.

Additionally, embodiments of the invention provide managing a plurality of jobs throughout a plurality of computing nodes of a parallel computing system by respectively scheduling the plurality of jobs for execution on a group of computing nodes from among the plurality of computing nodes based on an estimated processing requirement for each job of the plurality of jobs and the physical locations of the plurality of computing nodes in the data center. In those embodiments, the group of computing nodes is again selected to distribute at least one of a heat load and an energy load within the data center. The plurality of jobs may be subsequently executed on the group of computing nodes.

Hardware and Software Environment

Turning to the drawings, wherein like numbers may denote like parts throughout several views, FIG. 1 is a diagrammatic illustration showing a parallel processing computing system ("system") 10 consistent with one embodiment of the invention. In particular, the system 10 may have an architecture consistent with a BlueGene® computer architecture, as developed by International Business Machines, Inc. ("IBM") of Armonk, N.Y. For example, and in other specific embodiments, the architecture of the system 10 may be consistent with a BlueGene/L architecture, a BlueGene/C architecture, a BlueGene/P architecture, a BlueGene/Q architecture, another parallel processing system architecture, or combinations thereof. Therefore, it will be appreciated by one having ordinary skill in the art that the system 10 is representative of other parallel processing systems.

The system 10 may include a plurality of processing nodes (hereinafter, "nodes"). The nodes may include a plurality of computing nodes ("compute nodes") 12 and a plurality of input/output nodes ("I/O nodes") 14. The compute nodes 12 may be arranged in a regular array or matrix and collectively perform the bulk of the work performed by the system 10. Each compute node 12 includes one or more computing cores and a memory from which to store and execute tasks. The compute nodes 12 communicate with each other through a torus network or a tree network, as described more fully herein. A fully configured BlueGene/L system, in one specific embodiment, includes about 65,536 compute nodes 12 operable to process tasks and about 1,024 I/O nodes 14 operable to maintain an interface between the compute nodes 12 and other system components.

The I/O nodes 14 maintain an interface between the compute nodes 12 and front end nodes 16, external resource servers 18, service nodes 20, and network 22. The I/O nodes 14 may interface with the front end nodes 16, external resource servers 18, and service nodes 20 by way of the network 22, which in a specific embodiment may be a gigabit Ethernet network. The I/O nodes 14 are operable to maintain communication for a group of compute nodes 12 from among the plurality of compute nodes 12. In a specific embodiment, each I/O node 14 maintains communications for up to about sixty-four compute nodes 12. In this manner, each I/O node 14 provides access to resources of the system 10 for a specific number of compute nodes 12. The I/O nodes 14 may also be operable to perform process authentication and authorization, job accounting, debugging, troubleshooting, booting, and configurations. Thus, work for the compute nodes 12 is simplified and additional burdens on each compute node 12 that would present themselves by interfacing with vast numbers of I/O nodes 14 and other system components are avoided.

The front end nodes 16 may store compilers, linkers, loaders, and other programs to interact with the system 10. The front end nodes 16 may be accessed by a user, who may submit one or more programs for compiling, tasks for execution, execution contexts, workloads, part of a workload, or jobs to the service nodes 20. As such, the front end nodes 16 may be configured with user interfaces, such as user input devices and a display (neither shown). In alternate embodiments, the front end nodes 16 may interface with one or more workstations or other computing systems (not shown). The front end nodes 16 may each include a collection of processor and memory that performs certain auxiliary functions which, for reasons of efficiency or otherwise, may be best performed outside compute nodes 12, I/O nodes 14, or service nodes 20. For example, interactive data input, software code editing, software code compiling, and/or other user interface functions may be handled by front end nodes 16.

The service nodes 20 may include databases and administrative tools for the system 10. The databases may maintain state information for the computing nodes 12, including the current scheduling of jobs across the compute nodes 12, while the administrative tools may control the scheduling and loading of programs, tasks, data, and jobs onto the compute nodes 12, including loading programs, tasks, data, and jobs onto computing core of each compute node 12. As such, the service nodes 20 may, in some embodiments, gather a subset of compute nodes 12 from the plurality of compute nodes 12 (i.e., a "group" compute nodes 12) and dispatch at least one task, job, application, part of a workload, execution context, or program to the group of compute nodes 12 for execution. Hereinafter, the at least one task, job, application, part of a workload, execution context, or program will be referred to as a "job" for the sake of brevity. A job may be communicated across the network 22 and through the I/O nodes 14 to a compute node 12 to be processed by a computing core of the compute node 12. It will be appreciated by one having ordinary skill in the art that the functionality of the front end nodes 16 and service nodes 20 may be combined in a control subsystem operable to receive, manage, schedule, redistribute, and otherwise control jobs for the compute nodes 12.

Front end nodes 16 and service nodes 20 may each include of a group of compute nodes 12 and at least one I/O node 14 of the system 10. In this way, front end nodes 16 and service nodes 20 may be internally connected to the compute nodes 12 and I/O nodes 16 through one or more of the plurality of networks described hereinafter as well as network 22. Alternately, front end nodes 16 and service nodes 20 may each include of a group of compute nodes 12 and at least one I/O node 14 separate from the system 10 (i.e., "stand-alone" nodes). The external resource servers 18 may be servers that provide interfaces to various data storage devices, such as, for example, disk drives 19, or other I/O devices, resources, or components that may be accessed to process a job.

Figure 2:
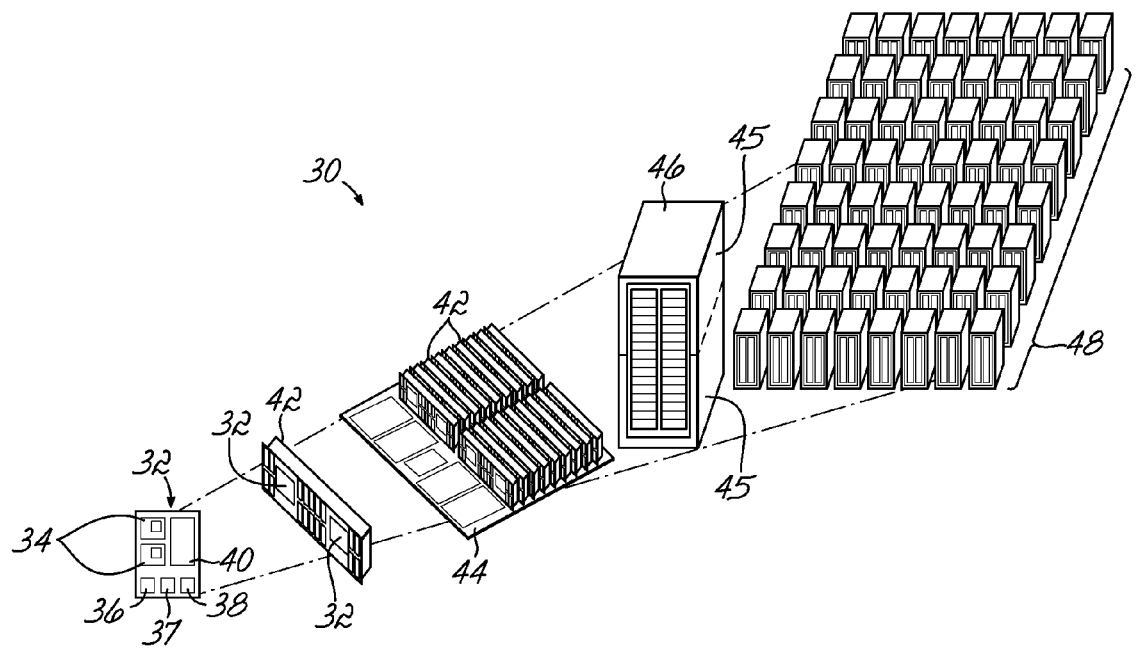
FIG. 2 is a diagrammatic illustration of an architecture of the parallel processing computing system of FIG. 1 showing the element progression from a computing core to a card, a node board, a cell, a cabinet, and finally to the parallel processing computing system consistent with embodiments of the invention.

FIG. 2 is a diagrammatic illustration 30 showing components 32, 42, 44, 46, and 48 of the system 10 consistent with embodiments of the invention. The system 10 is configured as a highly scalable, cell-like architecture that can be replicated in a regular pattern as the system is scaled up. The system 10 fundamentally includes the plurality of nodes, a node being shown generally at 32 (i.e., node 32 may be a compute node 12, an I/O node 14, a front end node 16, or a service node 20). Each node 32 typically comprises one or more computing cores 34, an Ethernet adapter 36, a torus network adapter 37, a collective network adapter 38, and a memory 40, which may include a local and/or remote cache memory. About two nodes 32 may be mounted onto a card 42. Up to about seventeen cards 42 (i.e., and in one specific embodiment, sixteen compute node 12 cards and one I/O node 14 card) are typically placed on a node board 44. Up to about sixteen node boards 44 comprise a midplane, or cell 45, two of which may be positioned inside a cabinet 46 for a total of up to about one-thousand and twenty-four compute nodes 12 and up to about sixty-four I/O nodes 14 per cabinet 46, or about five-hundred and twelve compute nodes 12 and about thirty-two I/O nodes 14 per cell 45. The system 10 may include up to about sixty-four cabinets 46 as shown at 48, and, thus, in some embodiments, over sixty-nine thousand nodes 32. In alternate implementations of the system 10 consistent with embodiments of the invention, there may be more or fewer cabinets 46, cells 45, boards 44, cards 42, and/or nodes 34.

Figure 3:
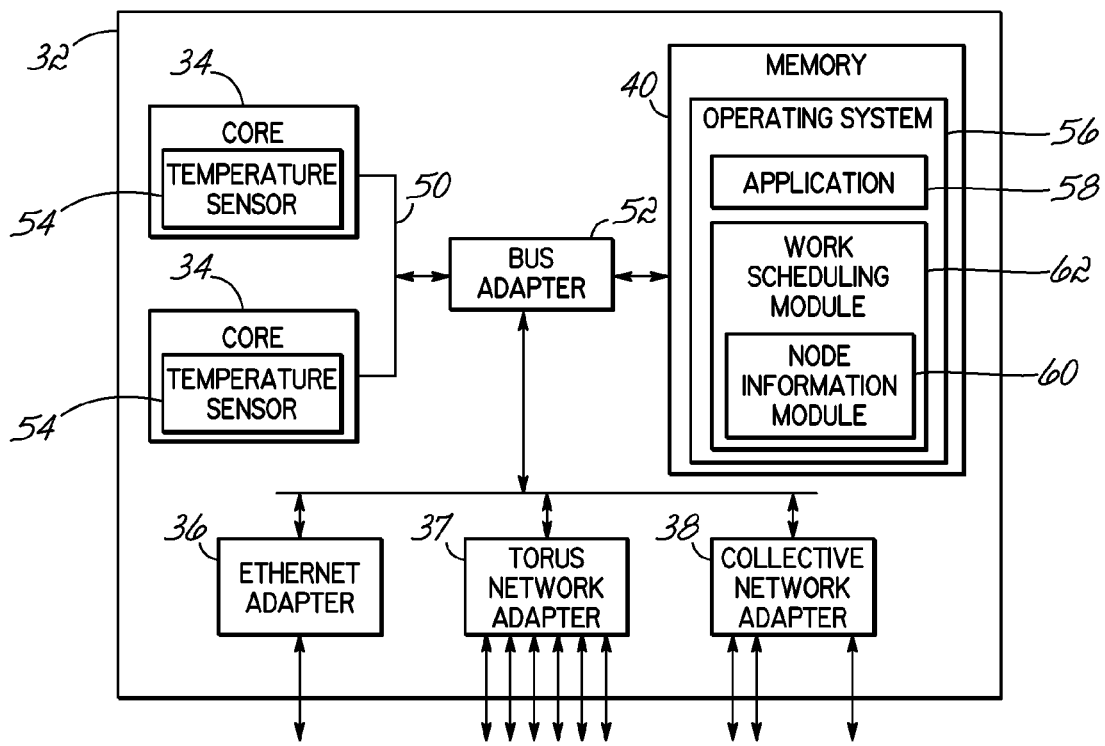
FIG. 3 is a block diagram showing the hardware and software components of one embodiment of the computing core of FIG. 2.

FIG. 3 is a block diagram showing the hardware and software components of one embodiment of the node 32 of the system 10 of FIG. 1 and FIG. 2. Each node 32 includes one or more computing cores 34 that communicate with a memory 40 by way of a bus as at 50 managed by a bus adapter 52. Each computing core 34 may include one or more processors, controllers, field programmable gate arrays, or application specific integrated circuit, while memory 40 may include random access memory devices (including synchronous dynamic random access memory), cache memories, non-volatile memories, and read-only memories. For example, and in one specific embodiment, each computing core 34 may be a microprocessor, such as a PowerPC microprocessor as produced by IBM. For example, and in another specific embodiment, each computing core 34 may be a multi-element architecture microprocessor that includes at least one general purpose processing element and a plurality of synergistic processing elements, such as a Cell Broadband Engine Architecture microprocessor as jointly developed by IBM, Sony Computer Entertainment of Tokyo, Japan, and Toshiba of Tokyo, Japan. In some embodiments, each computing core 34 may also include a heat load sensor 54 (hereinafter, "sensor" 54) to measure and indicate the heat load of that computing core 34. In a specific embodiment, the sensor 54 may be a temperature sensor as is well known in the art. As shown in FIG. 3, each node 32 includes two computing cores 34. One having ordinary skill in the art will appreciate that each node 32 may include more or fewer computing cores 34 than those illustrated, and in one specific embodiment each node 32 includes four computing cores 34.

Each node 32 is configured with an operating system 56 operable to execute an application 58. The operating system 56 may be a simplified-function operating system that includes state data for maintaining the processing state(s) of the node 32. In one specific embodiment, operating system 56 is operable to only support only one, or a few, jobs at a given time, as opposed to a multi-tasking operating system configured on a typical personal computing system. As such, operating system 56 may not, and advantageously does not, include certain functions normally associated with a multi-tasking operating system, including software, routines, components, or program code to support multi-tasking, various I/O devices, error diagnostics and recovery, etc. As such, and in one specific embodiment, the operating system 56 may include a simplified version of a Unix-like operating system, such as Linux. It will be appreciated by one having ordinary skill in the art that other operating systems may be used, and that it is not necessary that all nodes 32 employ the same operating system (i.e., the application 58 may be a "multi-platform" application operable to be installed across multiple and different operating systems or operating environments).

Application 58 is a copy of program code being executed by the node 32, and may include a complete copy of program code being executed by the system 10. Alternately, application 58 may be a subdivided portion of the program code being executed by the system 10 as a whole. As such, the application 58 may be a distributed application of the type that is operable to be configured across a plurality of nodes 32 (i.e., more than one node 32) to process a workload 25, 26, or 28. Application 58, in one embodiment, is operable to configure one or more jobs for each computing core 34 on the node 32 upon which it is configured. Local copies of data for the application 58, or data from the application 58, may be reserved in some portion of memory 40 in a file cache (not shown). Memory 40 may also include an application stack (not shown) that includes data corresponding to the execution progress of a job by the application 58.

Memory 40 may include a node information module 60 configured to store information about system 10 and/or nodes 32. For example, each node information module 60 is configured to store information associated with its respective computing cores 34, node 32, jobs (including historic information), cooling sources of the system 10, power circuits of the system 10, and/or data center(s) configured with the system 10. In this way, information in the node information module 60 may be used to schedule jobs across the nodes 32, computing cores 34, and/or system 10 to reduce heat and/or energy loads. Information for each node 32 may be stored in that node's information module 60. Additionally, information for each node 32 may be accessed by the front end nodes 16, external resource servers 18, resources 19, or service nodes 20.

The node information module 60 may be configured in a work scheduling module 62 configured to schedule jobs across the system 10 such that a heat load (i.e., the heat generated by the system 10) and/or an energy load (i.e., the energy, or power, consumed by the system 10) are distributed throughout the system 10. In specific embodiments, the front end nodes 16, service nodes 20, and/or a computer connected thereto may include the work scheduling module 62. As such, the work scheduling module 62 may be configured to distribute jobs across the system 10 to avoid heat imbalances (i.e., "heat islands") and/or power imbalances across the system 10.

The computing cores 34 may communicate through the bus 50 to the bus adapter 52. The bus adapter 52 maintains the integrity of data flow in the node 32 and manages the data communication of the computing cores 34, network adapters 36, 37, and 38, as well as memory 40. The network adapters may include an Ethernet adapter 36, a torus network adapter 37, and a collective network adapter 38. The Ethernet adapter 36, torus network adapter 37, and collective network adapter 38 interconnect each node 32 to provide multiple complimentary, high speed and low latency networks. These networks may include a private Ethernet network that provides access to any node 32 for configuration, booting, and/or diagnostics (i.e., through the Ethernet adapter 36), as well as a three-dimensional torus network operable to provide peer-to-peer communication between the nodes 32 (i.e., through the torus network adapter 37) and a collective network for collective messaging communication (i.e., through the collective network adapter 38). Each node 32 may use part of one computing core 34, or one or more computing cores 34 in their entirety, to manage the network connections and the network adapters 36, 37, and 38 of that node 32.

One having ordinary skill in the art will appreciate that additional components, memory, communications adapters, network adapters, or interfaces may be provided for each node 32 without departing from the scope of the present invention. For example, and in a specific embodiment, each I/O node 14 may be further configured with additional adapters, such as another Ethernet adapter or other I/O hardware to communicate with the front end nodes 16, external resource servers 18, service nodes 20, and/or network 22. Additionally, in another specific embodiment, each I/O node 14 may be configured with an operating system 56 that includes additional I/O interface software or software that adds additional functionality, such as software that dedicates one or more computing cores 34 to I/O operations only. Furthermore, each I/O node 14 may be configured with additional components, such as a computing core 34 dedicated only to I/O operations and an additional external memory that provides the I/O node 14 additional resources to perform I/O tasks. In another specific embodiment, each node 32 may be further configured with an adapter to communicate to a JTAG master circuit, providing back-door access into the node 32 for testing and troubleshooting in a manner well known in the art.

Figure 4:
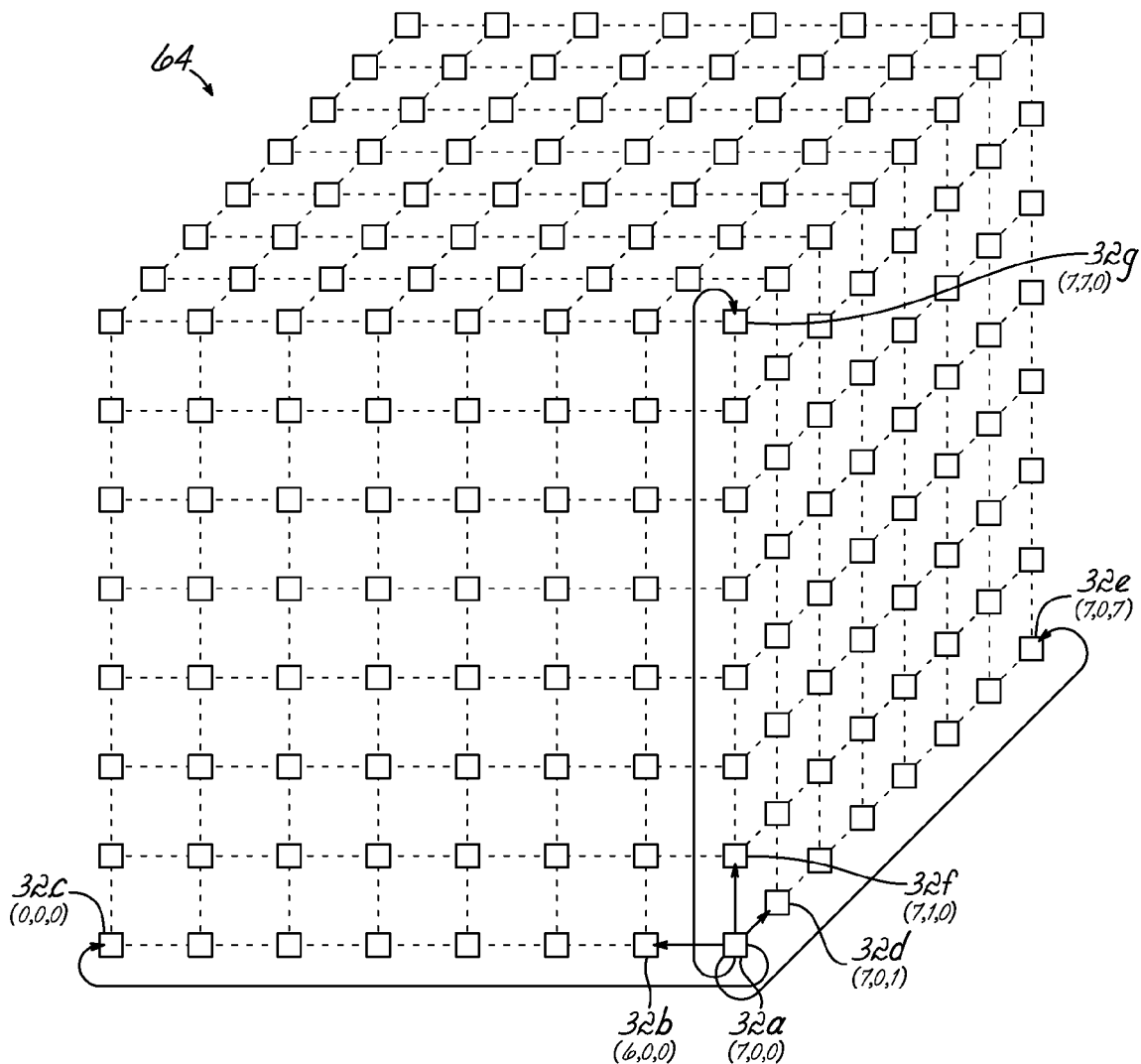
FIG. 4 is a simplified block diagram illustrating a three-dimensional torus network through which the computing cores of the parallel processing computing system of FIG. 1 and FIG. 2 may communicate.

The torus network adapter 37 provides each node 32 access to a point-to-point network configured as a three-dimensional torus where every node is connected to six other nodes in a mesh, forming a "cube" of (x,y,z) nodes. As such, each node 32 may communicate in one of six directions through the six bidirectional links shown coming from the torus network adapter 37 in FIG. 3. FIG. 4 is a simplified block diagram showing the three-dimensional torus network 64 of a cell 45 of the system 10 of FIG. 1 and FIG. 2. As illustrated in FIG. 4, and as previously disclosed, each cell 45 may include an eight-by-eight matrix of about five-hundred and twelve interconnected nodes 32. Advantageously, each node 32 may be equally distant to its six neighbors, except for those on the "edges" or "faces" of the torus network 64 (i.e., the edges or faces of the three-dimensional matrix torus network 64). Those nodes 32 on the edges or faces of the torus network 64 may communicate through communications links (i.e., wires, leads, network connections) that are "wrapped" around the network 64.

Each node 32 includes a set of six node-to-node communications links. In the context of the present invention, and to illustrate communications in the torus network 64, the cell 45 includes a node 32a with the coordinates (7,0,0). This node 32a may be a particular type of node 32, such as a master compute node operable to control a subset of the compute nodes in the cell 45. As illustrated, the node 32a may communicate with any other node 32 in the torus network 60 by initially communicating to one of six "neighbor" nodes 32b-g linked to the node 32a through direct inter-nodal communications paths (i.e., paths which do not have to traverse another compute node 12). The coordinates of these neighbor nodes are (6,0,0) for node 32b, (0,0,0) for node 32c, (7,0,1) for node 32d, (7,0,7) for compute node 32e, (7,1,0) for compute node 32f, and (7,7,0) for compute node 32g. As shown in FIG. 4, the torus network 64 is "wrapped" at the edges. As such, for any given node 32, it is possible to algorithmically determine the set of neighbors of that node 32 from the matrix structure and location of that node 32 in the torus network 64.

It will be appreciated by one having skill in the art that the representative torus network 64 of FIG. 4 is merely illustrative, and that actual physical considerations may prevent the physical structure of the torus network 64 shown in FIG. 4. Moreover, a wide variety of interconnection types, network types, member types, etc., may be permitted to coexist with one another in an efficient and reliable manner in parallel computing system. As such, nodes 32 in a cell 45 may be arranged in a tree network, bus network, linear network, mesh network, style-7 network, or another suitable network as is well known in the art without departing from the scope of the invention. Individual nodes may thus not be physically located in close proximity with other nodes as is well known in the art (i.e., the individual nodes may be geographically separated from other nodes).

Figure 5:
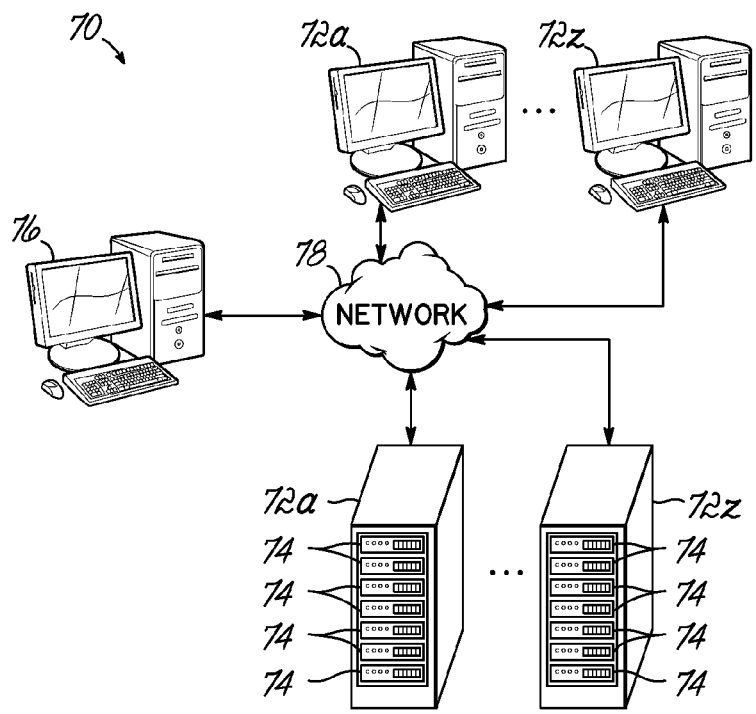
FIG. 5 is a diagrammatic illustration of an alternate embodiment of a parallel processing computing system that includes computing systems and servers consistent with embodiments of the invention.

FIG. 5 is a diagrammatic illustration of an alternate embodiment of a parallel processing computing system ("system") 70 consistent with embodiments of the invention. In the illustrated embodiment of FIG. 5, the nodes of the system 70 may include one or more computing systems 72a-z and/or servers 74. In this embodiment, there is a central administrators computer ("admin" computer) 76 connected to a network 78. The admin computer 63 manages the processing of the system and dispatches workloads and/or tasks to the computing systems 72a-z and/or servers 74. A plurality of servers 74 may be configured in a plurality of server cabinets, shown at 80a-z. Computing systems 72a-z and servers 74 in cabinets 80a-z, in specific embodiments, may be computers, computer systems, computing devices, servers, disk arrays, or programmable devices such as multi-user computers, single-user computers, handheld devices, networked devices (including computers in a cluster configuration), mobile phones, video game consoles (or other gaming systems), etc. As such, each of the computing systems 72a-z and servers 74 may each include one or more processors coupled to memory, operating systems, and network interfaces. Thus, the system 70 of FIG. 5 may operate in much the same way to perform parallel processing as the parallel computing system 10 shown throughout FIGS. 1-4. One having ordinary skill in the art will appreciate that the computing systems 72a-z and servers 72 may perform substantially the same functions as the nodes 32 of the system 10. Each of the computing systems 72a-z and servers 72 may be further configured with an application, throttling module, and processing progress record substantially similar to those shown in FIG. 3. Therefore, the system 70 of FIG. 5 may be used to distribute jobs across the computing systems 72a-z and servers 72 in a manner consistent with embodiments of the invention.

Figure 6:
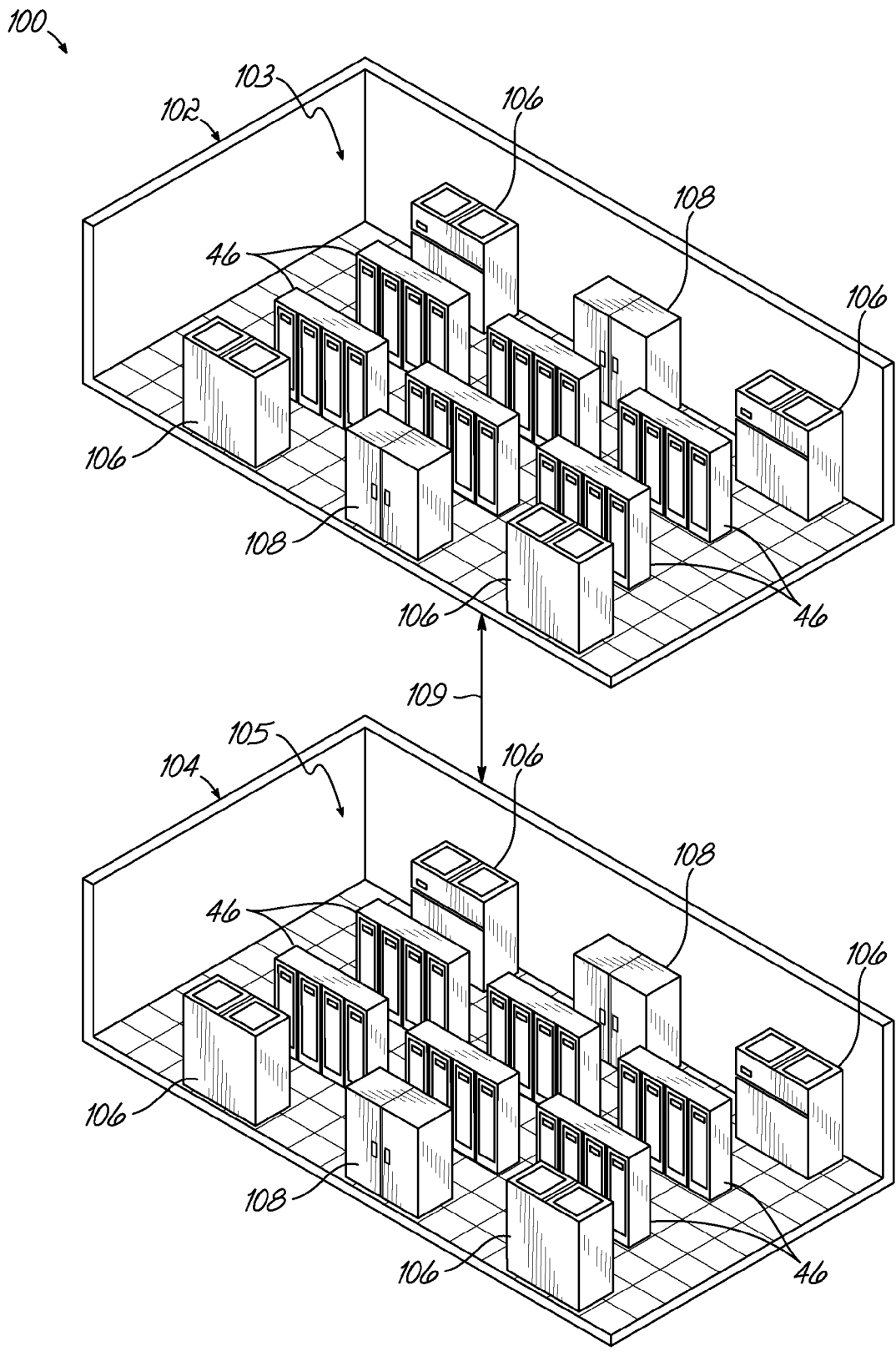
FIG. 6 is a diagrammatic illustration of the system of FIG. 1 and FIG. 2 distributed across a data center with multiple locations, rooms, power circuits, and cooling sources.

FIG. 6 is a diagrammatic illustration of a parallel processing computing system ("system") 100 consistent with the system 10 of FIGS. 1-4 and distributed across two locationally separate data centers 102 and 104. As illustrated in FIG. 6, the data centers 102 and 104 are disposed in two rooms 103 and 105, respectively, in which are distributed one or more cabinets 46. Each cabinet 46 includes about two cells 45, each cell 45 including up to about sixteen node boards 44, each node board 44 including up to about seventeen node cards 42, each node card 42 including up to about two nodes 32, and each node 32 including up to about two computing cores 34 (FIG. 2). As illustrated in FIG. 6, each data center 102 and 104 includes about twenty-four cabinets 46, about four cooling sources 106, and about two power circuits 108 in each room 103 and 105. Each cooling source 106 and power circuit 108 may be configured with a temperature sensor (not shown) to indicate the temperature of each of the cooling sources 106 and power circuits 108. In some embodiments, the cooling sources 106 are cooling towers or other cooling components, such as refrigeration or thermoelectric cooling units. For example, the cooling sources 106 may provide cool gasses such as air, nitrogen, or halon, or cool liquid such as water, mineral oil, or other non-electrically conductive liquid to the nodes 32 to reduce their temperature. Thus, one having ordinary skill in the art will appreciate that the term "cooling source" is used to generically refer to any cooling unit or component that may be used in a data center, and this term should not be construed to limit the invention to the cooling units and components disclosed herein. The connections from the cooling sources 106 to the cabinets 46, as well as the power connections for supplying power from the power circuits 108 and to the cabinets 46, may be underneath the floor of each room 103, 105 in a manner well known in the art.

One having ordinary skill in the art will appreciate that the system 100 of FIG. 6 is merely shown for illustrative purposes and is not meant to limit the scope of the invention. For example, one having ordinary skill in the art will appreciate that the system 100 may include more or fewer data centers 102 and 104, more or fewer rooms 103 and 105, more or fewer cabinets 46, more or fewer cells 45, more or fewer node boards 44, more or fewer node cards 42, more or fewer nodes 32, and more or fewer computing cores 34. Similarly, one having ordinary skill in the art will appreciate that the each room 103 and 105 may include more or fewer cooling sources 106 and more or fewer power circuits 108, as well as include a different arrangement of cabinets 46, cooling sources 106 and power circuits 108, without departing from the scope of the invention. The system 100 may communicate between the datacenters 102 and 104 as at communications link 109.

Thus, FIG. 6 may be referenced to illustrate various real-world environmental considerations that may be taken into account when distributing work throughout the system 100 consistent with the invention, such as data center 102, 104 information (for example, whether the system is configured across multiple data centers 102, 104 and/or rooms 103, 105, as well as the locations of power circuits 108 and cooling sources 106) and node information (for example, the number and locations of nodes 32 in data centers 102, 104, the power circuits 108 each node 32 draws power from, the distance of nodes 32 from cooling sources 106, the cooling source 106 that each node 32 is primarily cooled by, the height off the floor in each data center 102, 104, the temperature of the cores 34 of the nodes 32).

While FIG. 1 illustrates separate resource servers 18 and service nodes 20, one having ordinary skill in the art will appreciate that the resource servers 18 may be service nodes 20 configured to maintain the resources of the system 10. Similarly, while FIG. 5 illustrates a separate admin computer 76 from the computing systems 72a-z and servers 74, one having ordinary skill in the art will appreciate that the admin computer 76 may be incorporated into one or more of the computing systems 72 and/or servers 74. Additionally, while the node 32 of FIG. 3 comprises a specific hardware implementation having particular application within the context of an embodiment consistent with the invention, it is not intended to limit the scope of the invention. It should consequently be appreciated that the invention may be implemented in other computers and data processing systems, e.g., in single or multi-user computers such as workstations, desktop computers, portable computers, server computers and the like, or in other programmable electronic devices (e.g., incorporating embedded controllers and the like) operating as, or within, a parallel processing computing system.

Those skilled in the art will recognize that the environments illustrated in FIGS. 1 6 are not intended to limit the present invention. In particular, while the nodes of FIGS. 1 4 are shown connected in a modular fashion, any combination of local area networks (LAN's), wide area networks (WAN's) and/or other networking topologies known in the art may alternatively be used to network computing. Indeed, those skilled in the art will recognize that other alternative hardware and/or software environments may be used without departing from the scope of the invention.

The routines executed to implement the embodiments of the invention, whether implemented as part of an operating system or a specific application, component, program, object, module or sequence of instructions executed by one or more nodes 32, computing cores 34, or other processors, will be referred to herein as "computer program code," or simply "program code." The computer program code typically comprises one or more instructions that are resident at various times in various memory and storage devices in the system 10, and that, when read and executed by one or more nodal or other processors of the system 10, cause that system to perform the steps necessary to execute steps, elements, and/or blocks embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Environment Based Work Distribution

Figure 7:
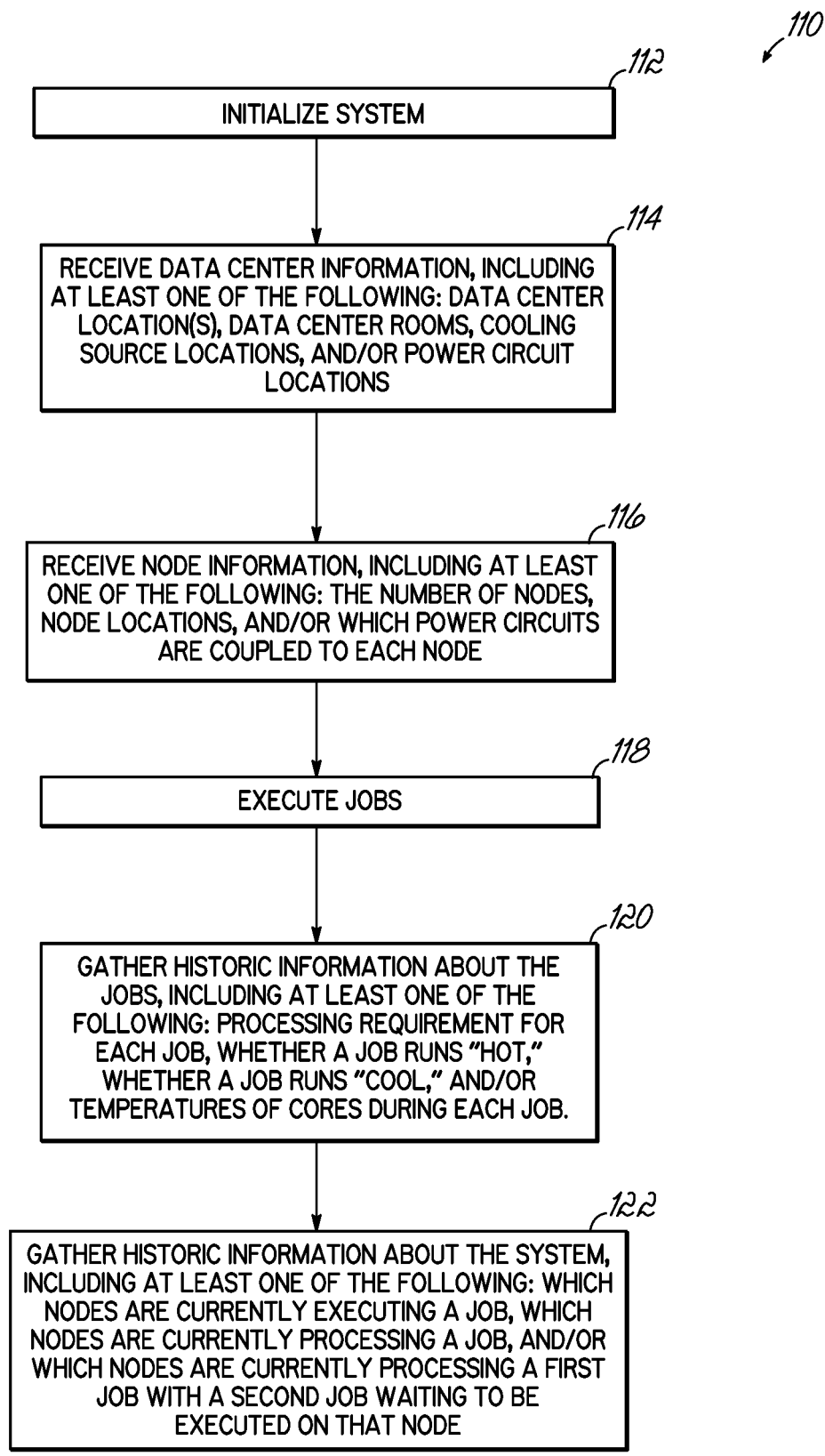
FIG. 7 is a flowchart illustrating blocks executable by systems consistent with those illustrated throughout FIGS. 1-6 to initialize, receive, and gather information that may be used to schedule jobs.

FIG. 7 is a flowchart 110 illustrating blocks executable by a parallel processing computing system (system) consistent with those illustrated throughout FIGS. 1-6 to initialize, receive, and gather information that may be used to schedule jobs across the system. In block 112, the system is initialized. This may include initializing the entire system or only some nodes of the system, such as the front end nodes and service nodes. In block 114, the program code receives data center information for the system. In some embodiments, the program code may request, from the user, information corresponding to at least one of the location of the data center(s) that the system is configured across, as well as the location of each room, cooling source, and/or power circuit of the data center(s). In specific embodiments, the program code may request a graphical representation of the physical location of the data center(s), physical location of each room of the data center(s), physical location of each cooling source, and/or physical location of each power circuit. The program code may receive the data center information and determine the layout of components of a data center, including whether the system is configured across multiple geographic locations, data centers, and/or rooms. The program code may also determine the locations of the cooling sources and/or power circuits throughout the data center.

In block 116, the program code receives node information of the system. In some embodiments, the program code may request, from the user, information corresponding to the number of nodes (e.g., compute, I/O, front end, and/or service nodes) in the system and/or their locations throughout the data center. In specific embodiments, the program code may request a graphical representation of the physical location of each node, including the (x,y,z) location of each node in each room of the data center. Additionally, the program code may request, from the user, information corresponding to the nodes each power circuit is coupled to in block 116. The program code may receive the node information and determine the layout of the nodes in a data center, including whether the nodes are configured across multiple geographic locations, data centers, and/or rooms.

The program code may schedule jobs to the nodes based on the gathered information, among other factors and may initiate execution of the jobs in block 118. In block 120, the program code gathers historic information about the jobs. In specific embodiments, the program code may gather information corresponding to at least one of a processing requirement of each job, whether the job causes the node to run "hot," whether the job causes the node to run "cool," the average length of the job, and/or the average temperature of a node during execution of the job. For example, a job may run "cool" when it has many instances where it must wait for data, resource access, and/or for other jobs to complete, among other reasons. Alternatively, a job may run "hot" when it executes substantially continuously, must be executed with high usage of core processing resources, and/or executes substantially continuously or with high usage of processing resources for a long period of time. Additionally, the program code may also gather information about the system in block 122. In some embodiments, the program code may also gather information indicating the number of nodes that are not currently executing a job (free nodes), those nodes that are currently processing a job, and/or those nodes that are currently processing a first job with a second job waiting to be executed on that node in block 122. The program code may schedule jobs across the system to distribute at least one of a heat load and an energy load across the system based on that information.

Figure 8:
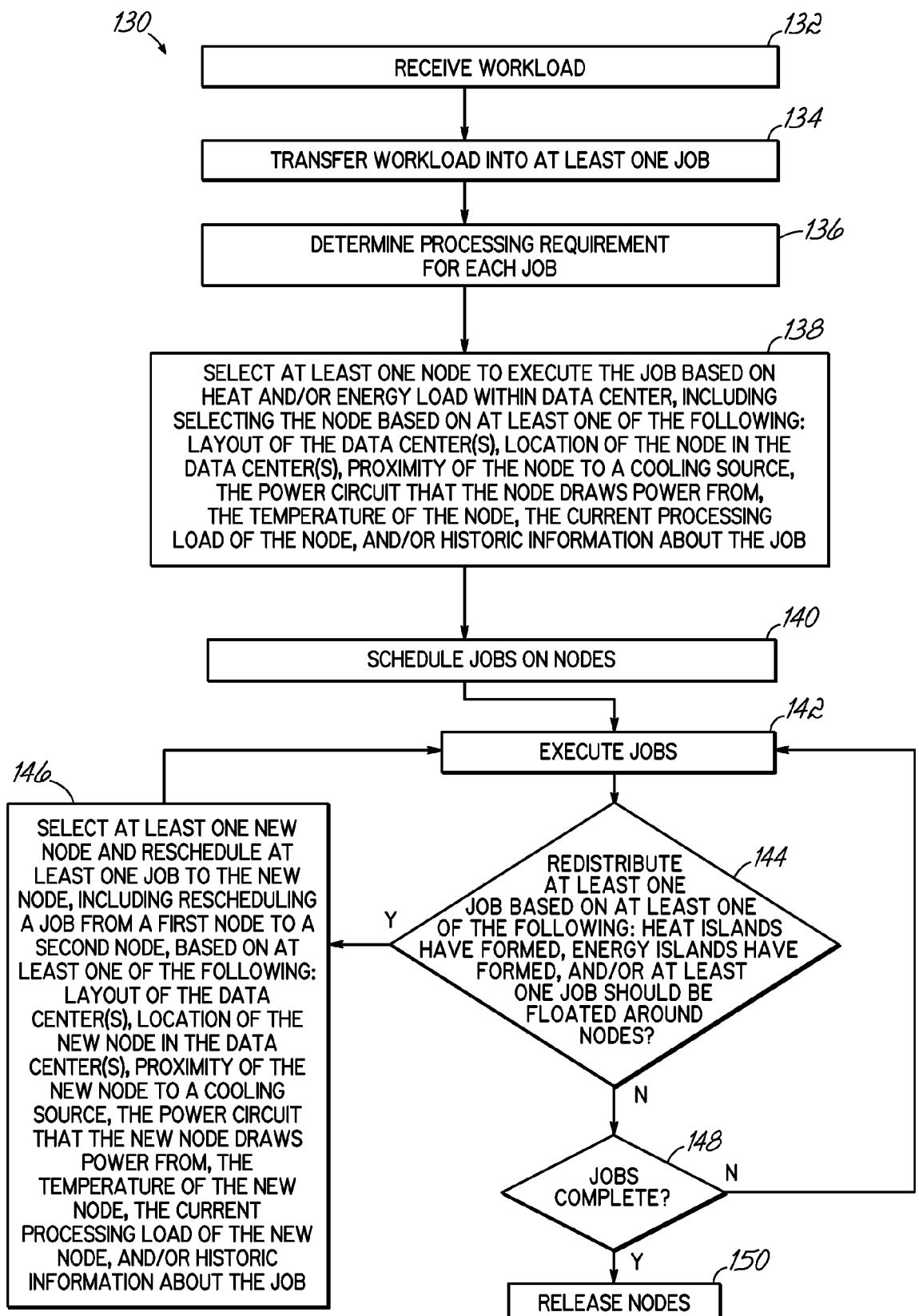
FIG. 8 is a flowchart illustrating blocks executable by the systems consistent with those illustrated throughout FIGS. 1-6 to schedule jobs to distribute at least one of a heat load and an energy load within the systems or a data center.

FIG. 8 is a flowchart 130 illustrating blocks executable by the systems consistent with those illustrated throughout FIGS. 1-6 to schedule jobs to distribute at least one of a heat load and an energy load within the system or a data center. In block 132, the program code receives a workload. In some embodiments, the front-end nodes may receive the workload and transfer the workload to the service nodes. In block 134, the program code analyzes the workload and transforms the workload into at least one job that may be executed by the nodes of the system. In some embodiments, the service nodes may analyze the workload and transform the workload into the at least one job. In block 136, the program code may determine an estimated processing requirement for each job. As such, the program code may determine the amount of work that will be required to process each job, as well as determine the increased heat and/or energy load for the node and/or system that may be caused by the job. In some embodiments, the program code may also determine the processing requirements of the job by referencing historic information about jobs.

In block 138, the program code selects at least one node to execute the at least one job based on the heat and/or energy load within the data center. In specific embodiments, the program code may select the node based on the information received in blocks 114 and/or 116, or the information gathered in blocks 120 and/or 122, of FIG. 7. Returning to block 138 of FIG. 8, the program code may select a node based on at least one of the following: the layout of the data center(s), the location of at least one node of the system in the data center(s), the location of at least one node in relation to at least one cooling source (for example, based on the proximity of at least one node to a cooling source, in that a node closer to a cooling source may be cooled more effectively), the configuration of at least one node in relation to at least one power circuit (for example, to reduce the power drawn from a particular power circuit, and thus attempt to decrease the heat generated by that power circuit), the temperature of at least one node (for example, determining the temperature of a plurality of nodes, then selecting at least one node with at least a lower temperature than the node with the highest temperature, or selecting nodes to address heat islands), the current processing load of at least one node (for example, selecting at least one free node, or at least one node that has substantially completed a current job), and/or historic information about the job (for example, based on an estimated processing requirement for the job, or such that a job known to use large amounts of node resources and otherwise run hot may be scheduled on a cool node, and alternatively a job known to use small amounts of node resources and otherwise run cool may be scheduled on a hot node). Thus, the program code selects at least one nodes to schedule the respective at least one job based on at least the location of the plurality of nodes, and in some embodiments additionally based on an estimated processing requirement to process the job. In block 140, the program code schedules the jobs on the selected nodes. In some embodiments where the workload is transformed into a plurality of jobs, the program code selects a group of nodes from the plurality of nodes to schedule the respective plurality of jobs, and distribute at least one of the heat load and/or energy load of the system.

In block 142, the jobs are executed. In block 144, the program code monitors the system to determine if at least one job needs to be rescheduled to distribute the heat and/or energy load. In block 144, the program code may redistribute the heat and/or energy load based on determining at least one of the following: that heat islands have formed (for example, determining that temperatures in a first subset of the plurality of nodes of the system substantially proximate to each other have elevated temperatures, while a second subset of the plurality of nodes of the system substantially proximate to each other do not), energy islands have formed (for example, determining that a first power circuit is configured to provide power to a first group of nodes and requires more power than a second power circuit configured to provide power to a second group of nodes), and/or that at least one job should be "floated" around the nodes (for example, determining that the temperature of a first node has increased in response to a job, determining a second node that has a lower temperature than the first node, then determining that the job should be moved to the second node).

When the program code determines that at least one job should be redistributed in block 144, the program code selects at least one node for those jobs and reschedules the determined jobs on those new nodes in block 146. In particular, the program code may select at least one new node for at least one job and/or reschedule at least one job from a first node to a second node, in a manner similar to that described in block 138. Thus, the system may schedule jobs to distribute at least one of the heat load and/or energy load. The program code then continues to execute the jobs in block 142.

When the program code determines that the jobs should not be redistributed, the program code determines whether the jobs have completed in block 148. When the jobs have not completed, the program code returns to block 142 to execute the jobs. When the jobs have completed, the program code releases the nodes that have completed their jobs in block 150.

Figure 9:
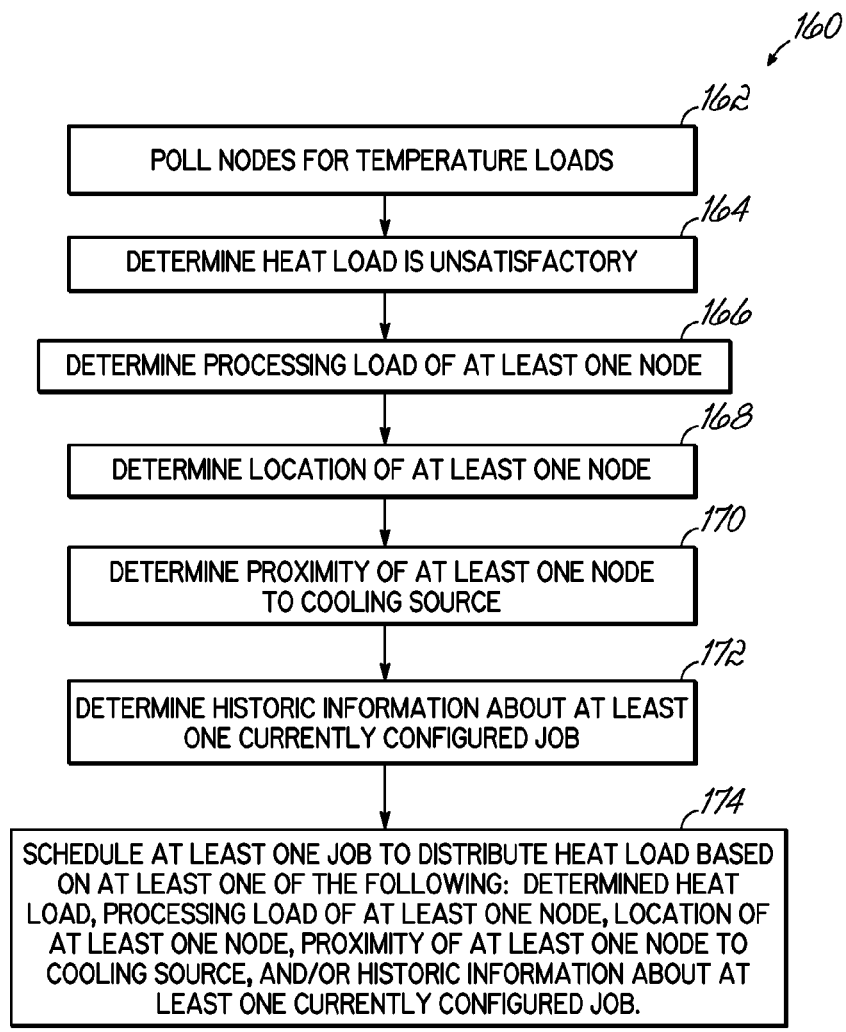
FIG. 9 is a flowchart illustrating blocks executable by the systems consistent with those illustrated throughout FIGS. 1-6 to schedule jobs to re-distribute an unsatisfactory heat load throughout the systems.

FIG. 9 is a flowchart 160 illustrating blocks executable by the systems consistent with those illustrated throughout FIGS. 1-6 to distribute an unsatisfactory heat load within a system. In block 160, the system polls for the temperature load of each node. In some embodiments, the system may determine the temperature from each heat load sensor of each computing core of each node. In block 162, the program code determines that the heat load of at least one node is unsatisfactory, and determines the processing load of at least one node in block 166. In some embodiments, the heat load is unsatisfactory when heat loads have formed in the system. Additionally, in some embodiments the processing load of the node generally includes whether the node is busy, the time remaining on when the node is busy, and whether a job is waiting to be executed by the node. In some embodiments, the program code may determine the heat load of all the nodes of the system and determine which nodes are not currently configured with jobs in block 166. In block 168, the program code determines the locations of at least one node. In some embodiments, the program code may determine the locations of all the nodes of the system in block 168. In block 170 and 172, the program code determines the proximity of at least one node to at least one cooling source, and determines historic information about at least one currently configured job, respectively. In some embodiments, the program code may determine the proximity of all the nodes of the system to their respective and closest cooling sources, as well as determine historic information about all the currently configured jobs of the system in blocks 170 and 172, respectively. Thus, in block 174 the program code may schedule at least one job to distribute the heat load, including scheduling at least on job from a first node to a second node, based on at least one of the following: the determined heat load, the processing load of at least one node, the location of at least one node, the proximity of at least one node to a cooling source, and/or historic information about at least one currently configured job.

Figure 10:
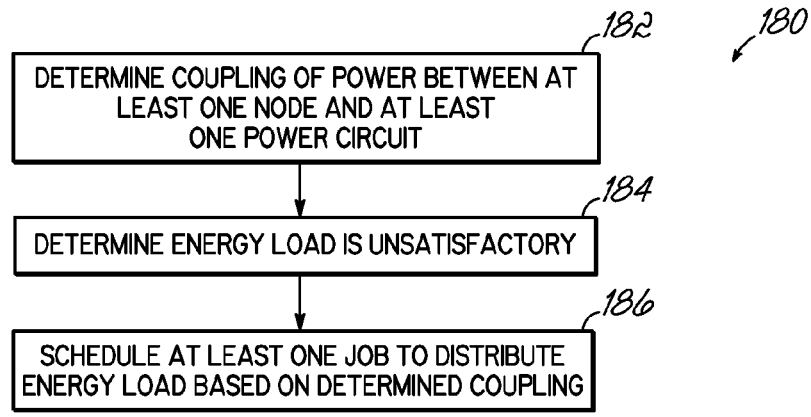
FIG. 10 is a flowchart illustrating blocks executable by the systems consistent with those illustrated throughout FIGS. 1-6 to schedule jobs to re-distribute an unsatisfactory energy load throughout the systems.

FIG. 10 is a flowchart 180 illustrating blocks executable by the systems consistent with those illustrated throughout FIGS. 1-6 to schedule jobs to distribute an unsatisfactory energy load within a system. In block 182, the program code determines the coupling of power between at least one node and at least one power circuit, and in block 184 the program code determines that the energy load of at least one power circuit is unsatisfactory. In some embodiments, the energy load is unsatisfactory when one power circuit is using substantially more power than another. Thus, in block 186 the program code schedules at least one job to distribute the energy load based on the determined coupling, including scheduling at least one job from a first node to a second node.

FIG. 11 is a diagrammatic illustration 190 of a node and system information table that includes information about the nodes of a system. In some embodiments, the node and system information table 190 indexes information about the nodes of the system based on a unique identification of each node, and includes information about the cores of the nodes, whether each core is busy and the time left for processing a job if the core is busy, whether each core has a job waiting, and the temperature of each core. The node and system information table 190 also includes information about location of each node in the data center and rooms, including an indication of the particular data center and room, the (x,y,z) location of the node, and the proximity of each node to a cooling source. The node and system information table 190 further includes information about the power circuit the node is coupled to and the proximity of the closest cooling source. The node and system information table 190 of FIG. 11 indicates a system configured with at least five nodes across two data centers and at least three rooms. Thus, and consistent with embodiments of the invention, the program code can store information about the system and the node to schedule, or re-schedule, jobs in the system.

FIG. 12 is a diagrammatic illustration 200 of a power circuit information table that includes information about the power circuits of a system. In some embodiments, the power circuit information table 200 indexes information about each power circuit using a unique identifier for each power circuit and includes information about the energy load of the power circuits as a number, out of ten, that indicates the current level of power being drawn from each power circuit. Furthermore, the power circuit information table 200 includes information about the temperature of each power circuit, as well as the data center, room, and (x,y,z) location of each power circuit. The power circuit information table 200 further includes information about the proximity of the closest cooling source. Thus, and consistent with embodiments of the invention, the program code can store information about the power circuits to schedule, or re-schedule, jobs in the system.

FIG. 13 is a diagrammatic illustration 210 of a cooling source information table that includes information about the cooling sources of a system. In some embodiments, the cooling source information table 210 indexes information about each cooling source using a unique identifier for each cooling source and includes information about the nodes and power circuits served by the cooling sources. Furthermore, the cooling source information table 210 includes information about the temperature of the air from each cooling source as well as the data center, room, and (x,y,z) location of each cooling source. Thus, and consistent with embodiments of the invention, the program code can store information about the cooling source to schedule, or re-schedule, jobs in the system.

FIG. 14 is a diagrammatic illustration 220 of a job information table that may include the historic information about each job that is executed by a system. In some embodiments, the job information table 220 indexes information about each job using a unique identifier for each job and includes information about each job processed, or being processed, by the system, including the average temperature and length of each job, as well as indications of whether the job runs "hot" or "cool," and an indication of the processing requirements for the job. Furthermore, the job information table 220 may include information about the average increase of temperature to a core caused by the job, the average increase to the energy load of a power circuit (out of ten), and special instructions for the job. In some embodiments, the special instructions for the job indicate that a job should be configured on a hot node (i.e., to cool the hot node) or that the job should be configured close to a cooling source. Other special instructions may include indications of a particular data center to localize the job to, a particular node to localize the job to, or other special instructions about execution, configuration, or scheduling of a job. Thus, and consistent with embodiments of the invention, the program code can store information about the jobs to schedule, or re-schedule, jobs in the system.

One having ordinary skill in the art will appreciate that the data in the tables 190, 200, 210, and 220 illustrated throughout FIGS. 11-14 is merely illustrative and not meant to be limiting. For example, the tables 190, 200, 210, and 220 may include more information or less information than that shown. Also for example, information may be presented in various ways that are well known in the art. As such, and in relation to the node and system information table 190 (and possibly applicable to other tables), the time left to process each job may include an indication of the days left for the job, the proximity to cooling source information may be in meters, and various parts of the system (i.e., data center, room, power circuit, cooling source, etc.) may be referred to in a different manner. Similarly, and in relation to the power circuit information table 200, the energy load information may indicate the actual amount of power being drawn from each power circuit in kilowatt hours as opposed to a value, out of ten, that indicates the energy load of that power circuit. Additionally, and in relation to the job information table 220, the indication of the processing requirements of a job may be indicated as a percentage of usage of a core, rather than a general indication of "high," "medium," or "low." Furthermore, the average increase to the energy load may include the amount of power being drawn for that job as opposed to a value, out of ten, that indicates the average increase of energy load. Moreover, the special instructions about the job may be in a machine-readable format configured to be processed by the program code as is well known in the art. Thus, the tables 190, 200, 210, and 220 of FIG. 11-14 are not meant to limit the scope of the present invention, and are meant to be merely illustrative of the information stored by the system.

Further details and embodiments of the present invention will be described by way of the following examples.

EXAMPLE 1

By way of example, the system may include a plurality of nodes and receive a workload. In response to receiving the workload, the system may split the workload into a plurality of jobs, and in this example the system may split the workload into two jobs. The system may be configured to attempt to distribute the heat load of the system in a substantially uniform manner. Using information gathered about the data center, nodes, the system, and/or historic information, the system may determine that a there are two nodes that are not currently configured with a job. The system may also determine that both of the nodes are configured in the same data center and room, that both are at the same (x,y,z) location in the room, and that both are the same distance from a cooling source. Moreover, the system may determine that both nodes are plugged into the same power circuit, as well as that the first node has a high temperature and the second node has a low temperature. Additionally, the system may determine the temperatures of the cores of the first node are the same, and the temperatures of the cores of the second node are the same. Furthermore, the system may determine that the first job of the two jobs runs cool and the second job runs hot. Thus, in this example, the system configures the first job with the second node and the second job with the first node. Therefore, the system attempts to configure the hot job with the cool node, and configure the cool job with the hot node to distribute the heat load of the system such that it is substantially uniform.

EXAMPLE 2

By way of further example, a system may include a plurality of nodes and receive a workload. In response to receiving the workload, the system may split the workload into a plurality of jobs, and in this example the system may split the workload into two jobs. The system may be configured to attempt to distribute the energy load of the system in a substantially uniform manner. Using information gathered about the data center, nodes, the system, and/or historic information, the system may determine that a there are two nodes that are not currently configured with a job, each of which is plugged into respective power circuits. The system may determine that a first power circuit is providing power up to half its full capacity as well as power to the first free node, while a second power circuit is providing power up to three-quarters of its capacity as well as power to the second free node. Furthermore, the system may determine that the first job draws a lot of power, while the second job draws little power. Thus, in this example, the system configures the first job with the first node and the second job with the second node. Therefore, the system attempts to configure the first job that requires more power with the first node that draws power from the first power circuit, and configure the second job with the second node that draws power from the second power circuit to distribute the energy load of the system such that it is substantially uniform.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is not limited to the specific details, representative apparatus and method described. One having ordinary skill in the art will further appreciate that the disclosure of the present invention is suitable to implement scheduling jobs across a data center, as well as across a parallel processing computing system, to distribute a heat load and/or an energy load. For example, one having ordinary skill in the art will appreciate that the disclosure of the present invention is suitable to implement scheduling jobs across a data center disposed in one room or spread across more than one room of a facility. Additionally and/or alternatively, one having ordinary skill in the art will also appreciate that the disclosure of the present invention is suitable to implement scheduling jobs across a data center disposed across two or more geographically remote facilities and one or more rooms in each of the two or more geographically remote facilities. As such, the invention in its broader aspects is not limited to the specific systems illustrated throughout FIG. 1-6, the flowcharts illustrated throughout FIGS. 7-10, or the tables illustrated throughout FIGS. 11-14. The blocks of FIGS. 7-10 may be combined and/or re-ordered without departing from the scope of the invention. Accordingly, departures may be made from such details without departing from the scope of applicants' general inventive concept.

What is claimed is:

1. A method of managing a plurality of jobs throughout a plurality of computing nodes of a parallel computing system disposed in a data center, the method comprising:
   in response to receiving a workload, dividing the workload into a plurality of jobs;
   accessing a job information table including historical information associated with at least one job of the plurality of jobs, wherein the job information table includes a unique identifier associated with the at least one job;
   accessing one or more tables including physical locations associated with each of the plurality of computing nodes and each of one or both of a plurality of power circuits or a plurality of cooling sources distributed throughout the data center, wherein the physical locations are defined by three-dimensional (x,y,z) coordinates stored in the one or more tables;
   scheduling the plurality of jobs in the workload for execution on a group of computing nodes from among the plurality of computing nodes in the parallel computing system based upon the physical locations of the plurality of computing nodes in the data center, the physical locations of the one or both of the plurality of power circuits or the plurality of cooling sources, and the historical information in the job information table, including selecting the group of computing nodes by assigning individual computing nodes to form the group so as to distribute at least one of a heat load and an energy load within the data center; and
   executing the plurality of jobs on the group of computing nodes.

2. The method of claim 1, wherein the job information table includes historical information indicating an average temperature and an average temperature increase for a core of a computing node associated with processing a particular job, and wherein the plurality of jobs are scheduled such that the heat load is distributed across the data center in a substantially uniform manner based at least in part on at least one of the indicated average temperature and the indicated average temperature increase for a core of a computing node associated with processing a particular job.

3. The method of claim 1, wherein the job information table includes historical information indicating an average energy load and an average increase to an energy load associated with processing a particular job, and wherein the plurality of jobs are scheduled such that the energy load is distributed across the data center in a substantially uniform manner based at least in part on at least one of the indicated average energy load the indicated average increase to an energy load associated with processing a particular job.

4. The method of claim 1, wherein scheduling the plurality of jobs further comprises:
   determining physical locations of the plurality of computing nodes in the data center based upon data received from a user interacting with a graphical representation of the data center.

5. The method of claim 1, wherein scheduling the plurality of jobs further comprises:
   rescheduling a job from a first computing node to a second computing node.

6. The method of claim 1, wherein scheduling the plurality of jobs further comprises:
   determining a computing node heat load for each computing node from among the plurality of computing nodes; and
   rescheduling a job from a first computing node with a high computing node heat load to a second computing node with a lower computing node heat load than that of the first computing node.

7. The method of claim 1, wherein scheduling the plurality of jobs further comprises:
   determining power circuit energy loads of the plurality of power circuits distributed throughout the data center; and
   rescheduling a job from a first computing node that draws energy from a first power circuit with a high power circuit energy load to a second computing node that draws energy from a second power circuit with a lower power circuit energy load than that of the first power circuit.

8. The method of claim 1, wherein the data center is distributed across two or more locations that are geographically distant from each other.

9. The method of claim 1, wherein the data center includes one or more cooling sources, and wherein scheduling the plurality of jobs is additionally based upon the physical locations of the plurality of cooling sources in the data center, including selecting the group of computing nodes so as to distribute the heat load within the data center.

10. The method of claim 9, wherein selecting the group of computing nodes so as to distribute the heat load within the data center includes selecting the group of computing nodes based upon proximity to the plurality of cooling sources.

11. The method of claim 1, wherein scheduling the plurality of jobs is additionally based upon an estimated processing requirement for each job of the plurality of jobs and upon a second indicator separate from a temperature indication for each job, wherein the second indicator characterizes a job based on the job waiting for at least one of data, resource access, and/or for other jobs to complete, the job executing substantially continuously, the job executing with high usage of core processing resources, or the job executing with high usage of processing resources for a long period of time.

12. A method of managing a plurality of jobs throughout a plurality of computing nodes of a parallel computing system disposed in a data center, the method comprising:
   in response to receiving a workload, dividing the workload into a plurality of jobs;
   accessing a job information table including historical information associated with at least one job of the plurality of jobs, wherein the job information table includes a unique identifier associated with the at least one job;
   accessing one or more tables including physical locations associated with each of the plurality of computing nodes and each of one or both of a plurality of power circuits or a plurality of cooling sources distributed throughout the data center, wherein the physical locations are defined by three-dimensional (x,y,z) coordinates stored in the one or more tables;
   scheduling the plurality of jobs in the workload for execution on a group of computing nodes from among the plurality of computing nodes in the parallel computing system based upon an estimated processing requirement for each job of the plurality of jobs, the historical information in the job information table, the physical locations of the one or both of the plurality of power circuits or the plurality of cooling sources, and the physical locations of the plurality of computing nodes in the data center , including selecting the group of computing nodes by assigning individual computing nodes to form the group so as to distribute at least one of a heat load and an energy load within the data center; and executing the plurality of jobs on the group of computing nodes.

13. The method of claim 12, wherein the plurality of jobs are scheduled such that the heat load is distributed across the data center in a substantially uniform manner.

14. The method of claim 12, wherein the plurality of jobs are scheduled such that the energy load is distributed across the data center in a substantially uniform manner.

15. A parallel computing system disposed in a data center, comprising:

a plurality of computing nodes, each computing node including at least one processing unit; and program code configured to be executed by the parallel computing system to manage a workload of the parallel computing system, the program code further configured to divide the workload into a plurality of jobs, access a job information table including historical information associated with at least one job of the plurality of jobs, wherein the job information table includes a unique identifier associated with at least one job, access one or more tables including physical locations associated with each of the plurality of computing nodes and each of one or both of a plurality of power circuits or a plurality of cooling sources distributed throughout the data center, wherein the physical locations are defined by three-dimensional (x,y,z) coordinates stored in the one or more tables, schedule the plurality of jobs in the workload for execution on a group of computing nodes from among the plurality of computing nodes in the parallel computing system based upon the physical locations of the plurality of computing nodes in the data center, the physical locations of the one or both of the plurality of power circuits or the plurality of cooling sources, and the historical information in the job information table, including selecting the group of computing nodes by assigning individual computing nodes to form the group so as to distribute at least one of a heat load and an energy load within the data center, and execute the plurality of jobs on the group of computing nodes.

16. The system of claim 15, wherein the program code is further configured to schedule the plurality of jobs such that the heat load is distributed across the data center in a substantially uniform manner.

17. The system of claim 15, wherein the program code is further configured to schedule the plurality of jobs such that the energy load is distributed across the data center in a substantially uniform manner.

18. The system of claim 15, wherein the program code is further configured to determine a computing node heat load for each computing node from among the plurality of computing nodes and reschedule a job from a first computing node with a high computing node heat load to a second computing node with a lower computing node heat load than that of the first computing node.

19. The system of claim 15, wherein the program code is further configured to determine power circuit energy loads of the plurality of power circuits and reschedule a job from a first computing node that draws power from a first power circuit with a high power circuit energy load to a second computing node that draws power from a second power circuit with a lower power circuit energy load than that of the first power circuit.

20. The system of claim 15, wherein the program code is further configured to schedule the plurality of jobs based upon the physical locations of the plurality of cooling sources at least one cooling source, including selecting the group of computing nodes so as to distribute the heat load within the data center.

* * * * *